US006915756B1

(12) United States Patent
McLachlan et al.

(10) Patent No.: US 6,915,756 B1
(45) Date of Patent: Jul. 12, 2005

(54) BELLS

(75) Inventors: Neil Maxwell McLachlan, Clifton Hill (AU); Anton Glenn Hasell, Mia Mia (AU)

(73) Assignee: Australian Bell Pty Ltd., Malvern (AU)

( * ) Notice: Subject to any disclaimer, the term of this patent is extended or adjusted under 35 U.S.C. 154(b) by 447 days.

(21) Appl. No.: 09/691,583

(22) Filed: Oct. 18, 2000

(30) Foreign Application Priority Data

Oct. 22, 1999 (AU) ............................................. PQ3613

(51) Int. Cl.[7] ................................................ B29D 17/00
(52) U.S. Cl. ..................... 116/148; 116/149; 29/896.2; 29/896.22; 84/103; 84/402
(58) Field of Search ................................ 116/148, 149, 116/150, 152, 171; 29/896.2, 896.22; 84/103, 402, 406, 407, 408, 409, 410

(56) References Cited

U.S. PATENT DOCUMENTS 296,515 A * 4/1884 Bowers ....................... 84/103
3,683,845 A * 8/1972 Doggart et al. ............. 116/148
3,760,482 A * 9/1973 Kawamura ................. 29/169.5
3,871,094 A * 3/1975 Nichols ..................... 29/169.5

FOREIGN PATENT DOCUMENTS

JP 03154098 * 6/1991 ................. 116/148
JP 05289655 * 11/1993 .................. 84/103

OTHER PUBLICATIONS

Hibberts, Bill; "The Sounds of Bells:Taylors of Loughborough and true–harmonic tuning" Jan. 27, 2002.*
Hibberts, Bill; "The Sounds of Bells" Jul. 7, 2002.*
Westcot, Wendell; Bells and Their Music, 1998, G.P.Putnam.*
Tomas J.A. et al., "Changing the Shape of Vehicle Components for Improving Performance", Rend.Sem.Mat.Univ-.Torino, Fascicolo Special Numerical Methods, pp. 113–139, (1991).

(Continued)

*Primary Examiner*—Christopher W. Fulton
*Assistant Examiner*—Travis Reis
(74) *Attorney, Agent, or Firm*—Reed Smith LLP

(57) ABSTRACT

A bell is described having the first at least three or more frequencies substantially in harmonic sequence. A method for designing such a bell is also disclosed. An optimization procedure is described wherein an initial bell shape is modified until the first at least three or more frequencies are substantially in an harmonic sequence. An asymmetric bell is also described wherein a meridonal cross-section of the side portion is substantially geometrically similar to a cross-section having: 1) an outer line formed by fitting an arc of a circle to the three described points of the nodes and an inner line formed by fitting a line to the described points of the nodes; or 2) having an outer line formed by joining a straight line to the two described points of the nodes and an inner line formed by fitting a line to the described points of the nodes.

23 Claims, 12 Drawing Sheets

OTHER PUBLICATIONS

McLachlan, N., Finite Element Analysis and Gong Acoustics, Acoustics Australia, vol. 25, No. 3 (1997) pp. 103–107.

Fountain, M.A. et al., "Tuning of Bells by Numerical Methods of Shape Optimisation", Advea Engineering Pty. Ltd., date unknown.

Fletcher et al. Bells, *The Physics of Musical Instruments*, pub. Springer–Verlag, Chap. 21, (1991), pp. 557–605.

ReSHAPE User's Manual, Version 99a (Reference RU99a), Advea Engineering Pty Ltd. (date unknown), pp. 1–101.

Lehr, A., "Designing Chimes and Carillons in History", Acustica—acta acustica, vol. 83 (1997), pp. 320–336.

Lehr, A., *The Designing of Swinging Bells and Carillon Bells in the Past and Present*, pub. Athanasius Kircher Foundation, Asten, The Netherlands (1987), pp. 1–70.

Schoofs, A. et al., "I.Computation of Bell Profiles Using Structural Optimization", Music Perception, vol. 4, No. 3, (Spring 1987), pp. 245–254.

Houtsma, A. J. et al., "II. A Perceptual Evaluation", Music Perception, vol. 4, No. 3. (Spring 1987), pp. 255–266.

Lehr, A., "III. From Theory to Practice", Music Perception. vol. 4, No. 3. (Spring 1987), pp. 267–280.

* cited by examiner

BELLS

FIELD OF THE INVENTION

The invention relates to the field of bell design and manufacture.

BACKGROUND OF THE INVENTION

A bell is a solid body that undergoes vibration and radiates energy into the air to make sound. A bell is typically a hollow body having an opening at one end (the "mouth"). In Western musical systems, bells are typically axisymmetric. Oriental bells having an oval (as opposed to a circular) cross-section are known.

It is convenient to define certain terms that are commonly used in the description of bells. A circular line on the circumference of the bell, in a plane normal to the axis of symmetry, is called a "ring". A line on the surface of the bell, in a plane parallel to, and passing through, the axis of symmetry, is called a "meridian". Similarly, a direction along a meridian is referred to as a "meridonal direction".

When a bell is struck, it undergoes a complex vibration. The vibratory motion of a bell may be regarded as a linear combination of different motions of the bell known as the bell's "normal modes of vibration", or, simply, "modes". Each mode of vibration represents a particular vibratory shape and takes place at a single frequency of vibration. Thus, the rich sound of a bell may be regarded as being the superposition of many different frequency components, with each frequency being due to its associated mode of vibration.

The acoustically important modes are those in which displacement occurs in a direction normal to the bell's surface, as these modes are able to most efficiently radiate their energy in the air in the form of sound. In what follows, it is to be understood that a reference to "modes" is a reference only to modes in which vibration occurs in a direction normal to the bell's surface. Similarly, a reference to "frequencies" is a reference only to frequencies due to modes in which vibration occurs in a direction normal to the bell's surface.

Typically (depending on how the bell is struck), the amplitude of vibration of higher frequency modes decays more rapidly than that for lower frequency modes so that after a short time (typically of the order of one second) only several of the lowest frequency modes continue to be heard. Furthermore, complex psycho-acoustic effects are generally believed to make only the several lowest frequency modes musically important and/or discernible.

We adopt the traditional naming convention of the modes according to the number and location of nodes, or stationary lines, of the mode in question. That is, modes are referred to as an ordered pair (m,n) where m is the number of meridonal nodal lines and n is the number of nodal rings. The (2,0) mode is the lowest frequency acoustically important mode ("the fundamental"). Where there are two modes satisfying the criteria of a given ordered pair (m,n), then the lower frequency mode is referred to as (m,n) and the higher frequency mode is referred to as (m,n#).

In this specification, a reference to the first, say, three, modes is a reference to the lowest frequency mode, the second lowest frequency mode and the third lowest frequency mode. Other references to the first number of modes are to be construed similarly.

In this specification, a reference to the "mode sequence" for a bell is a reference to a list of the modes of the bell, in order of the frequency of the modes and starting with the lowest frequency mode. Similarly, references to a "frequency sequence" are references to a list of the modal frequencies of a bell starting with the lowest modal frequency.

In this specification, references to frequencies "being tuned", and similar expressions, are references to modal frequencies which are desired to be modified to substantially adopt particular values. For example, in the case of an harmonic bell wherein the first five frequencies are to be substantially in an harmonic sequence, the first five frequencies are all "being tuned" or "to be tuned". In a similar vein, a reference to a "tuned bell" is a reference to a bell that has modal frequencies that have been tuned.

The sound quality or timbre of a bell is dependent upon the frequency ratios and relative strengths of the different frequency components in the sound emitted by the bell. Consequently, it has long been the goal of bell founders to make bells where the frequencies of the lowest several modes are tuned as nearly as possible to particular frequency ratios. For example, church bells are typically tuned so that the first five modes have frequencies that are as near as possible to the ratios (with respect to the fundamental): 1, 2, 2.4, 3 and 4. In this instance, the first five modes have traditionally been considered to be the modes (2,0), (2,1), (3,1), (3,1#) and (4,1).

This tuning system is referred to as the "minor third" because the frequency of the third mode is musically at an interval of a minor third above the frequency of the second mode (and an interval of a minor third plus an octave from the frequency of the first mode).

Handbells are generally smaller than church bells, and generally have a different tuning. Generally, only two modes are tuned in handbells. In the so-called English tuning of handbells, the frequency of the second mode (usually the (3,0) mode) is tuned to three times the frequency of the fundamental (the (2,0) mode). Others tune the second mode to 2.4 times the frequency of the fundamental to give the bell a minor third character.

Minor third bells generally have a curved outer wall of approximately hyperbolic shape in the meridonal direction. As the wall approaches the mouth of the bell, it generally includes a relatively thick portion, prior to termination of the wall at the mouth. This thicker portion is often referred to as the "sound bow". Handbells generally also have a thicker portion at around the same location, often referred to as the "lip".

Due to the complexity of the vibratory motion of a bell, it is considered practically impossible to design a bell with a given frequency distribution by only physical methods and/or simple computational methods.

In 1987 a team of Dutch engineers used a numerical computation scheme to design a major third bell, where the first five modes have frequencies in the ratios (with respect to the lowest frequency): 1, 2, 2.5, 3 and 4 ("The Physics of Musical Instruments", Fletcher and Rossing, Springer-Verlag, 1991, Chapter 21). The numerical scheme was based on the finite element method in conjunction with an optimisation algorithm. The finite element method (to be discussed further below) is, relevantly, a computational tool that is capable of numerically estimating the modes of vibration of a solid body and their associated frequencies.

Different major third bells have been designed. Each has a substantially visually different profile to that of the known minor third bell shapes. In particular, the major third bells have a curved outer surface with at least two extra turning points in the meridonal direction in comparison to the minor third bell shape.

Ideally, a bell with the greatest clarity (and, possibly, beauty) of sound would be an harmonic bell, that is a bell having at least the first several modal frequencies in the ratios 1, 2, 3, etc. Due to the complexity of bell vibrations, it has hitherto been considered impossible to design an harmonic bell. Indeed, the art of bell founding is known to date beyond 1600BC. However, an ideal or harmonic bell has never, until now, been produced. A bell with modes in an harmonic sequence would be expected to have many musical advantages over currently known bells. It is generally believed that pitch perception in humans is based on finding a best fit of an harmonic sequence to the perceived spectra of a sound, and attributing perceived pitch to the fundamental frequency of that, fitted, harmonic sequence. Bells with vibrational modes in an harmonic sequence would therefore be expected to create less ambiguous pitch perceptions.

Further, music is generally written for instruments with harmonic spectra (or very near to harmonic spectra). Consonant musical relationships are created when notes are tuned so that they have spectral frequencies that are in common and/or that are well separated. Since the spectral frequencies are whole number multiples of the fundamental frequency these notes have tended toward simple number ratios of each other in most musical tuning systems. Bells with harmonic spectra would therefore be expected to create more consonant musical relationships in most musical tuning systems and with most other musical instruments than currently known bells.

Finite element methods for numerically estimating the normal modes of a solid body, and their associated frequencies, are known. In this method, the body is notionally divided into many elements. The geometry or layout of this division is called a “mesh”. Individual elements are defined by so-called “nodes” which are points on the boundaries of elements. Many different element types, with different properties, and different areas of applicability, are known.

The finite element method, like other methods of analysing modes, is capable of estimating the mode shapes and frequencies of a body only for a particular, given, geometry.

It is known to use analysis methods, such as the finite element method, in conjunction with so-called “optimisation methods”. The goal of an optimisation method is, using certain optimisation rules, to successively modify the input to an analysis method (a given geometry in the case of analysing the modes of solid bodies) until the analysis method indicates that the performance of the input has succeeded in reaching a desired value (known as the “objective”). The performance criterion is quantified by way of the so-called “objective function”. The geometry produced by such successive modifications is said to be “optimised”. For example, in the case of optimising the shape of a bell to obtain a shape having particular modal frequencies, a given modal frequency would be the “objective function” and the optimisation method would use appropriate rules to modify the shape of the bell from a given starting shape, until the analysis method (eg the finite element method) indicated that the objective function had obtained the objective (ie that the bell had attained a shape having the desired modal frequencies).

It is known to use the finite element method in conjunction with an optimisation method to design a major third bell (as described above) and in the attempted design of a bell with “clarinet tuning” (described below).

However, a very considerable difficulty with using the finite element method together with an optimisation method to design a bell with a given frequency content is that, due to the large number of variable parameters and constraints (ie the extremely complex optimisation space), unless the starting shape is suitably close to the final optimised shape, the optimisation procedure simply will not generate a solution that meets its objective.

For example, it is known to use a cylindrical bell with a uniform wall thickness as a starting shape in an optimisation procedure in an attempt to find the shape of a bell that corresponds to “clarinet tuning”, that is a tuning in which the first four modes have the frequency ratios (with respect to the fundamental) of 1, 3, 5 and 7 (“Tuning of Bells by Numerical Shape Optimisation” by Fountain, Tomas, and Trippit). However, the best result achieved using the stated starting shape was a shape having frequencies in the ratios: 1, 2.74, 4.799 and 6.57. The errors are so large that, in practical terms, the optimisation procedure may be considered to have failed to reach its objective. Further, from a musical perspective, these errors are far too large for the bell to be useful.

SUMMARY OF THE INVENTION

In this specification, a reference to the frequencies of the first at least three modes being substantially in an harmonic sequence means that the frequencies of the first at least three modes substantially conform to the ratios 1, 2, 3 etc. (with respect to, and including, the fundamental). A bell wherein the frequencies of the first several modes are substantially in an harmonic sequence is referred to hereafter as “an harmonic bell”.

The bells and bell designs of the present invention have a top portion, a side portion and a mouth, the side portion extending from the top portion to the mouth.

According to one aspect of the present invention, there is provided a bell wherein the first at least three frequencies are substantially in an harmonic sequence.

According to another aspect of the present invention, there is provided a bell wherein the first at least four frequencies are substantially in an harmonic sequence.

According to a further aspect of the present invention, there is provided a bell wherein the first at least five frequencies are substantially in an harmonic sequence.

In one form of the invention all the tuned frequencies of the harmonic bell are due to modes with no ring nodes.

In another form of the invention, of the tuned frequencies of the harmonic bell, the frequencies due to modes with no ring nodes are all below any frequencies due to modes with ring nodes.

The outer surface of the side portion of the harmonic bell may be generally in the form of a truncated circular cone. The outer surface of the side portion of the harmonic bell may be generally convex. It may substantially consist of a generally convex portion and a portion generally in the form of a circular cylinder. It may substantially consist of a generally convex portion and a portion generally in the form of a truncated circular cone.

The inner surface of the side portion of the harmonic bell may be generally in the form of a truncated circular cone. The inner surface of the side portion of the harmonic bell may be generally concave. It may substantially consist of a generally concave portion and a portion generally in the form of a circular cylinder. It may substantially consist of a generally concave portion and a portion generally in the form of a truncated circular cone.

The side portion of the harmonic bell may be generally tapered.

According to another aspect of the present invention, there is provided a bell wherein the first at least three frequencies are substantially in an harmonic sequence, the bell being produced in accordance with a design according to a method of the present invention.

According to another aspect of the present invention, there is provided a bell wherein the first at least three frequencies are substantially in an harmonic sequence, the bell being copied from a bell produced in accordance with a design according to a method of the present invention.

According to a further aspect of the present invention, there is provided a method for designing a bell having the first at least three frequencies substantially in an harmonic sequence, the method comprising the steps of selecting an initial bell shape and using the initial bell shape in an optimisation procedure for modifying the bell shape such that it becomes an harmonic bell.

In one form of the invention the initial bell shape is such that the frequencies to be tuned are due to modes with no ring nodes.

In another form of the invention the initial bell shape is such that, of the frequencies to be tuned, all the frequencies due to modes without ring nodes are below any frequencies due to modes with ring nodes.

The initial bell shape is preferably selected by introducing one or more of the following shape features to a first bell shape:

(a) conicity or increased conicity;

(b) tapering of the side portion or increased tapering;

(c) concavity with respect to the inside surface of the bell or increased concavity;

(d) increased length of the side portion; or (e) decreased thickness of the side portion.

The initial bell shape may be a rescaled existing bell shape for an harmonic bell.

The optimisation procedure according to the present invention will be described below. However, at the present time it is important to be aware that the modal frequencies of a bell are generally highly sensitive to small variations of the wall thickness of the side portion of the bell. Accordingly, in defining the allowable shape changes that may be introduced during the optimisation procedure, it is typically effective to constrain either the inner or outer surface of the side portion and to allow the opposing outer or inner surface (as the case may be) to move (ie remain unconstrained) in order to vary the wall thickness of the side portion and to thereby adjust the modal frequencies during optimisation.

In designing an harmonic bell using an optimisation procedure it is believed to be necessary to have an initial bell shape for use in the optimisation procedure that has modal frequencies or frequency ratios being suitably close to their desired values in order for the optimisation objectives to be achieved. In this regard, high modal frequencies (and hence frequency ratios) are generally more sensitive to changes in the wall thickness of the side portion than lower modal frequencies (and frequency ratios). Consequently, the higher modal frequencies may be more easily tuned in subsequent optimisation iterations.

Accordingly, in order to bring the initial shape suitably close to the ultimate shape for successful optimisation, the higher modal frequencies or frequency ratios need not be as close to the desired values as for lower modal frequencies or frequency ratios.

Accordingly, one aspect of the present invention provides shape features for a bell shape to generate an initial bell shape for producing an harmonic bell in an optimisation procedure, the initial bell shape having frequencies suitably close to desired frequencies. In a further aspect, the present invention provides shape features for a bell shape to generate an initial bell shape for producing an harmonic bell in an optimisation procedure, the initial bell shape having frequency ratios suitably close to desired frequency ratios.

It was realised that the problem in using an optimisation procedure to produce an harmonic bell from an initial bell shape of known bell shape, given that the initial bell shape for use in the optimisation procedure must have modal frequencies or frequency ratios that are suitably close to their desired values, is that the first several modes in the mode sequence of known bell shapes include both modes without ring nodes (ie (m,0) modes) and modes with ring nodes (ie (m,n) modes where $n \geqq 1$), wherein at least one mode with at least one ring node is interspersed between modes without ring nodes. This distribution of modes in the mode sequence makes it extremely difficult, if not practically impossible, to choose an appropriate initial bell shape for optimisation in the absence of being able to control, at least to some extent, the nature of the mode distribution in the mode sequence.

For example, the problem in generating an harmonic bell having more than the first three modes tuned (ie tuned to being substantially in an harmonic sequence) using an initial bell shape of a particular circular cylinder was that the first five modes were in the order (starting with the lowest frequency) (2,0), (3,0), (2,1), (4,0), (5,0). In this example, the frequency of the (3,0) mode and the frequency of the (4,0) mode cannot attain a sufficiently large frequency ratio during optimisation for the ratio 2:4 to be established as required. Typically, the frequencies of (m,0) modes on either side of a ring mode cannot attain a sufficiently large frequency ratio for the appropriate harmonic relationship to be established.

The present inventors have realised that this problem may be solved to provide suitable initial bell shapes for producing harmonic bells in an optimisation procedure by applying suitable shape features to an initial bell shape so that the mode sequence of the initial bell shape is as desired. As discussed above, it is generally more important that the lower modal frequencies of initial bell shapes are close to their desired values than is the case for higher modal frequencies. For this reason, it is generally more important that the mode sequence of the lower frequency modes of initial bell shapes is in a desired modal sequence than that the modal sequence for higher frequency modes is in a desired modal sequence. In fact, if the lower frequency modes of an initial bell shape are in a desired modal sequence, it may not be necessary to have regard to the modal sequence of higher frequency modes, even where some higher frequency modes are to be tuned.

In the case of designing an harmonic bell, it has been found preferable to utilise an initial bell shape for optimisation in which at least the lowest few frequencies being tuned all correspond to (m,0) modes. That is, at least the first few frequencies being tuned all correspond to modes with no ring nodes. For example, an harmonic bell with five modes in tune may be obtained by the method of the present invention using an initial bell shape where the first five modes are (2,0), (3,0), (4,0), (5,0), and (6,0). However, an harmonic bell with seven modes in tune may be obtained by the method of the present invention using an initial bell shape where the first seven modes are (2,0), (3,0), (4,0), (5,0), (6,0), (2,1), and (3,1). In the latter case, the ultimate bell shape will typically have a mode sequence as follows: (2,0), (3,0), (4,0), (5,0), (6,0), (7,0), and (8,0). In this case, the optimisation caused the frequencies of the (7,0) and (8,0) modes to drop below the frequencies of the (2,1) and (3,1) modes and the fact that the first five modes were all modes with no ring nodes was sufficient to render the initial bell shape suitable.

According to an aspect of the present invention, there is provided a method for designing a bell wherein the frequencies of the first at least three modes are substantially in an harmonic sequence, the method comprising the steps of selecting an initial bell shape and using the initial bell shape in an optimisation procedure according to the present invention, the initial bell shape being such that the frequencies of at least the first three modes each have no ring nodes. For the avoidance of doubt, in the preceding sentence, the second reference to "at least three modes" is not necessarily a reference to the same modes as referred to by the first reference to "at least three modes".

According to a further aspect of the present invention, there is provided a method for designing a bell wherein the frequencies of the first at least three modes are substantially in an harmonic sequence, the method comprising the steps of selecting an initial bell shape and using the initial bell shape in an optimisation procedure according to the present invention, the initial bell shape being such that, of the number of frequencies to be tuned, all the frequencies due to modes without ring nodes are below all the frequencies due to modes with ring nodes. For example, according to this aspect of the present invention, if five modes are to be tuned, then the initial bell shape must be such that, of the first five modal frequencies, all the frequencies due to modes without ring nodes are below all the frequencies due to modes with ring nodes (if any).

The present invention accordingly provides, in a further aspect, shape features for applying to an initial bell shape so that the modes associated with the frequencies being tuned are separated such that, of the number of frequencies to be tuned, all the frequencies due to modes without ring nodes are below all the frequencies due to modes with ring nodes.

Figure 6:
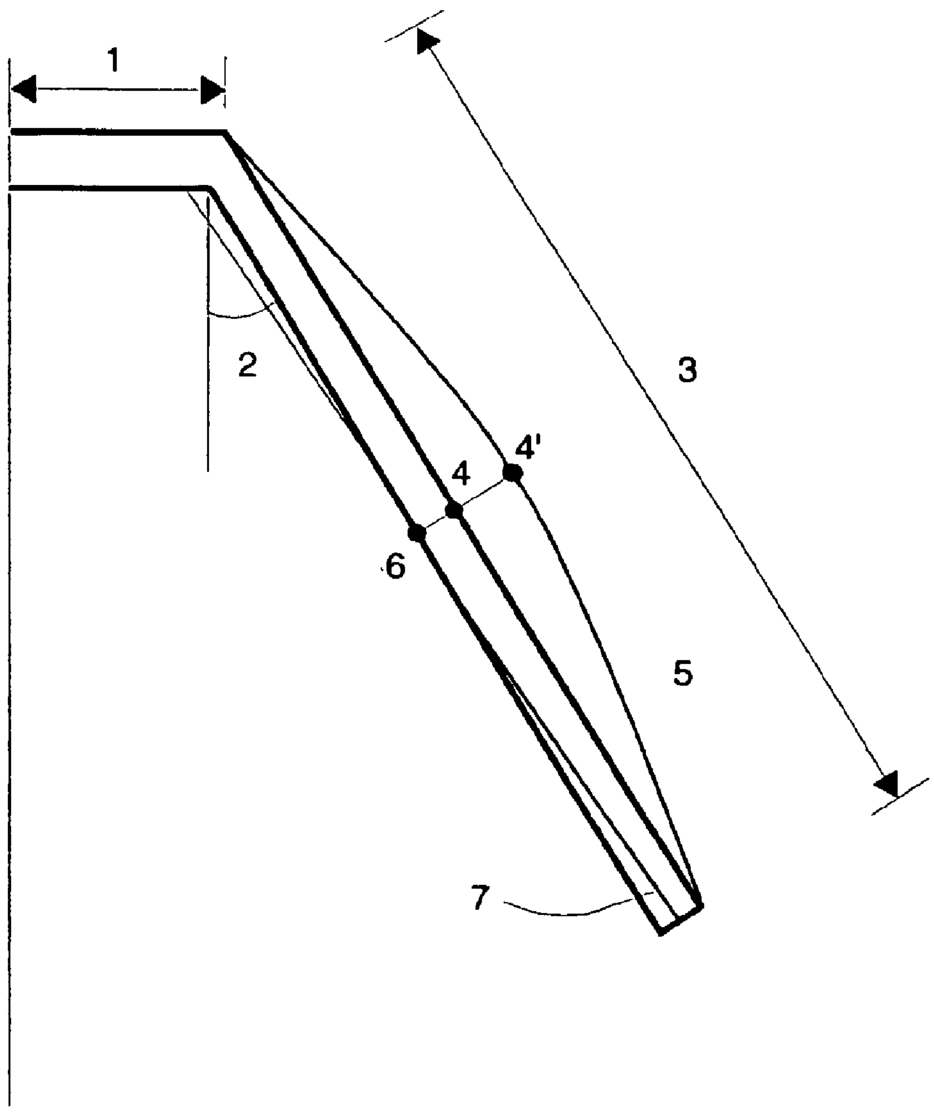
FIG. 6 shows a cross-section of a half of an example bell.

Shape features according to the present invention will now be described with reference to FIG. 6 which shows a cross-section of half a bell.

Figure 1:
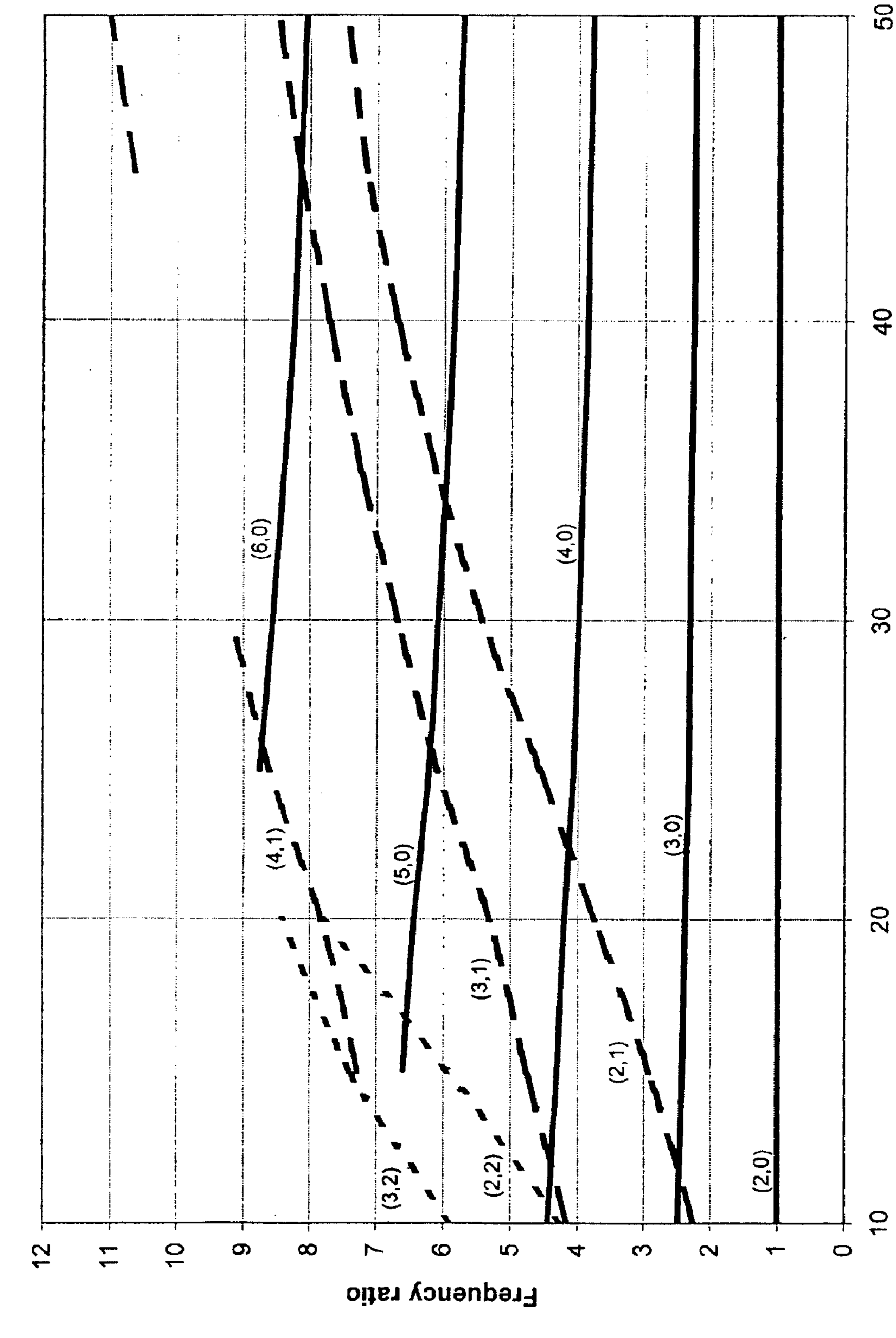
FIG. 1 is a graph which shows how the frequency ratios of the frequencies of the first several modes vary with cone angle of an example bell.

Conicity is a shape feature according to the present invention. Conicity refers to the angle of inclination of the side portion to the axis of symmetry of the bell (represented by numeral 2 in FIG. 6). FIG. 1 shows how the frequency ratios of the frequencies of the first several modes vary with cone angle, while other parameters remain unchanged, for an example bell shape with the following parameters. (These figures were determined using a finite element program.) The top portion is flat and has an equal thickness to the wall thickness of the side portion, namely 10 mm. The length of the side portion, measured in a direction parallel to the side portion (represented by numeral 3 in FIG. 6), is 210 mm. The radius of the top portion is 36 mm, measured with respect to the top face of the top portion (represented by numeral 1 in FIG. 6).

As can be seen from FIG. 1, it has been found that by varying only the angle of the side portion of the bell with respect to the axis of symmetry, the frequency ratios (with respect to the fundamental) of the lowest several (m,0) modes are reduced as the angle of conicity increases (except for the ratio of the (2,0) mode, which, of course, remains unity by definition). At the same time, as the angle of conicity increases, the frequency ratios of the first several (m,1) modes are increased. This increase is at a higher rate than the rate of decrease in frequency ratios of the (m,0) modes. At the same time, as the angle of conicity increases, the frequency ratios of the first several (m,2) modes are increased, at a higher rate than the rate of increase in frequency ratios of the (m,1) modes. As a consequence, as the angle of conicity increases, the more (m,0) modes are included in the mode sequence before a mode with a ring node appears in the sequence. For example, as can be seen from FIG. 1, at 20° the first two modes are (m,0) modes, at 30° the first three modes are (m,0) modes and at 40° the first four modes are (m,0) modes.

Figure 2:
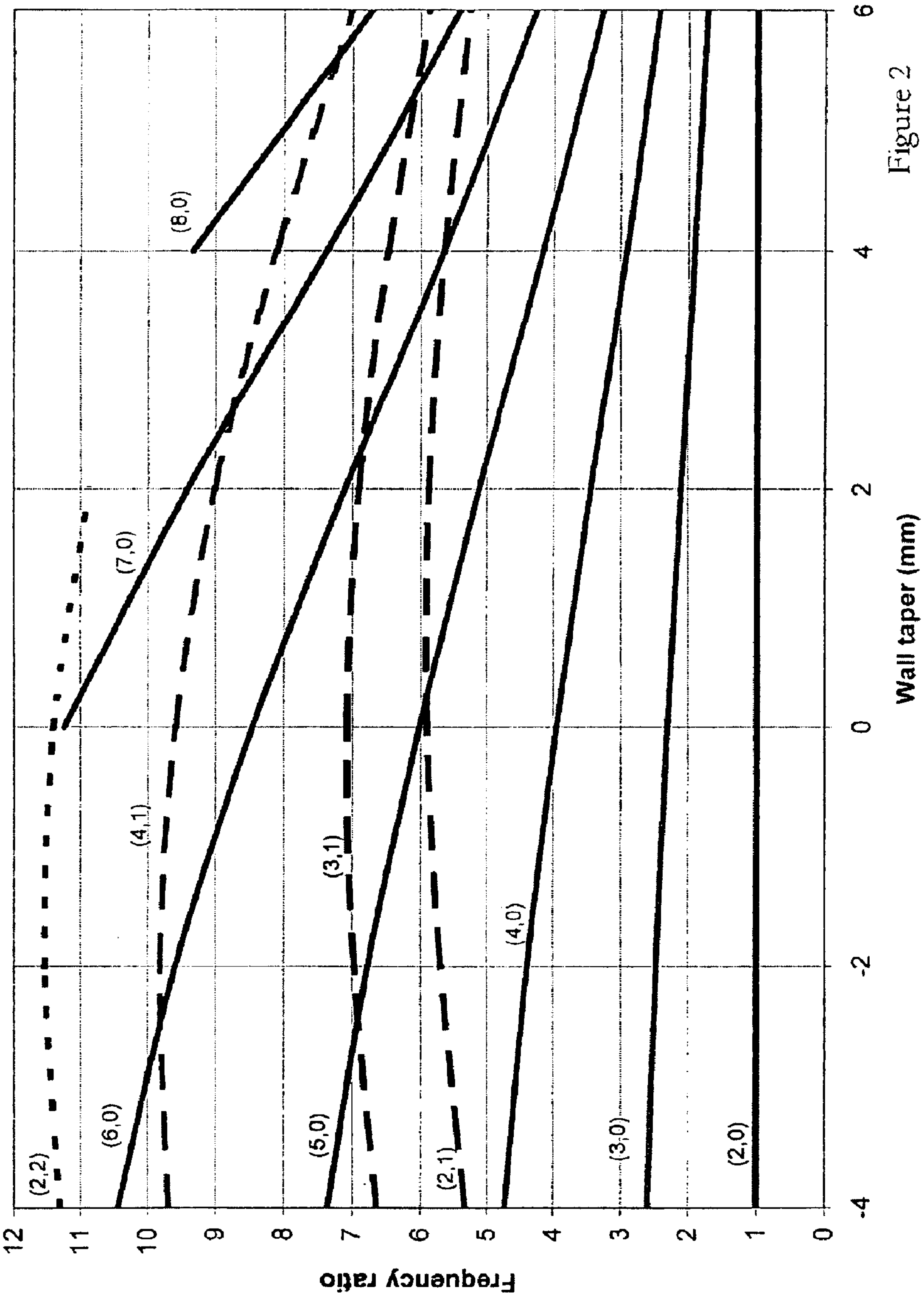
FIG. 2 is a graph which shows how the frequency ratios of the frequencies of the first several modes vary with taper of an example bell.

Taper is a shape feature according to the present invention. Taper refers to the angle of inclination of the inner surface of the side portion to the outer surface of the side portion. Uniform wall thickness is, of course, zero taper. The sign convention is adopted such that the taper is positive for the case where the side portion is thinner near the mouth than near the top portion. FIG. 2 shows how the frequency ratios of the frequencies of the first several modes vary with taper, while other parameters remain unchanged, for an example bell shape with the following parameters. (These figures were determined using a finite element program.) The bell is essentially a truncated circular cone, with a cone angle of 35 degrees. The top portion is flat and has a thickness of 10 mm. The length of the side portion, measured in a direction parallel to the side portion, is 210 mm. The radius of the top portion is 36 mm, measured with respect to the top face of the top portion. The taper is generated by rotating the line defining the inner surface of the side portion about its midpoint. Numeral 6 in FIG. 6 represents the midpoint about which the line is rotated and numeral 7 indicates the position of the inner surface following the introduction of the taper. The abscissa values of FIG.

2 represent the decreased (or increased thickness) of the side portion at the extremity of the side portion adjacent the mouth.

As can be seen from FIG. 2, it has been found that the introduction of a positive taper to a bell with a side portion in the form of a truncated cone, by varying only the angle of inclination of the inner surface of the side portion with respect to the outer surface, causes the frequency ratios (with respect to the fundamental) of the lowest several (m,0) modes to be reduced as the degree of taper increases. At the same time, as the degree of positive taper increases, the frequency ratios of the first several (m,1) modes are also decreased, but at a lower rate than the rate of decrease of the frequency ratios of the (m,0) modes. As a consequence, as the degree of positive taper increases, the more (m,0) modes are included in the mode sequence before a mode with a ring node appears in the sequence.

Wall curvature is a shape feature according to the present invention. It has been found that introducing curvature into the side portion of a bell in the form of a truncated cone has an effect upon the relative frequency ratios of the (m,0) modes with respect to the modes with ring nodes. In what follows, the descriptions "convex" and "concave" are with respect to viewing the inside surface of the side portion of the bell.

Figure 3:
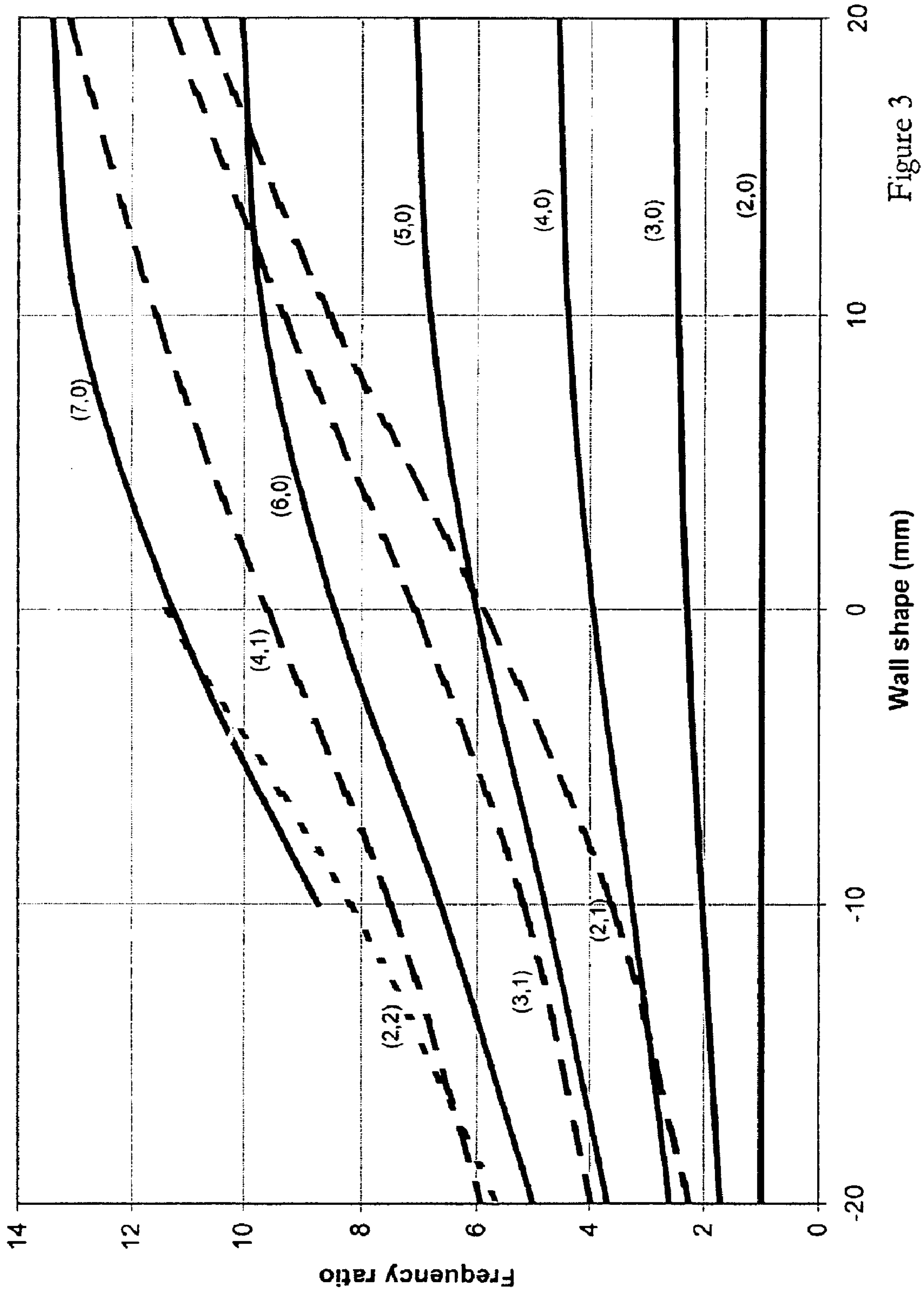
FIG. 3 is a graph which shows how the frequency ratios of the frequencies of the first several modes vary with particular changes in the curvature of the side portion of an example bell.

FIG. 3 shows how the frequency ratios of the frequencies of the first several modes vary with particular changes in the curvature of the side portion, while other parameters remain unchanged, for an example bell shape with the following parameters. (These figures were determined using a finite element program.) The curvature changes are to be viewed as changes to a shape that is essentially a truncated circular cone, with a cone angle of 35 degrees. The top portion is flat and has a thickness of 10 mm. The length of the side portion, measured in a direction parallel to the side portion, is 210 mm. The thickness of the side portion is also 10 mm. The radius of the top portion is 36 mm, measured with respect to the top face of the top portion. The curvature changes are defined by first defining a point being a translation normal to the surface of the side portion of the midpoint of the side portion, (represented by the translation of numeral 4 to numeral 4' in FIG. 6). The shape changes are to fit an arc of a circle to the translated midpoint and the two end points of the initial line (see the arc of a circle represented by numeral 5 in FIG. 6).

The abscissa values of FIG. 3 represent the displacement of the midpoint of the side portion normal to the initial straight line. The sign convention is such that concavity (with respect to the inside of the bell) is positive and convexity is negative. As can be seen from FIG. 3, introducing convexity into the side portion causes the frequency ratios of all of the first several modes to decrease, but the frequency ratios of the modes with ring nodes decrease faster than the frequency ratios of the (m,0) modes. Similarly, introducing concavity into the side portion causes the frequency ratios of all of the first several modes to increase, but the frequency ratios of the modes with ring nodes increase faster than the frequency ratios of the (m,0) modes. Consequently, as the degree of concavity increases, the more (m,0) modes are included in the mode sequence before a mode with a ring node appears in the sequence.

Figure 4:
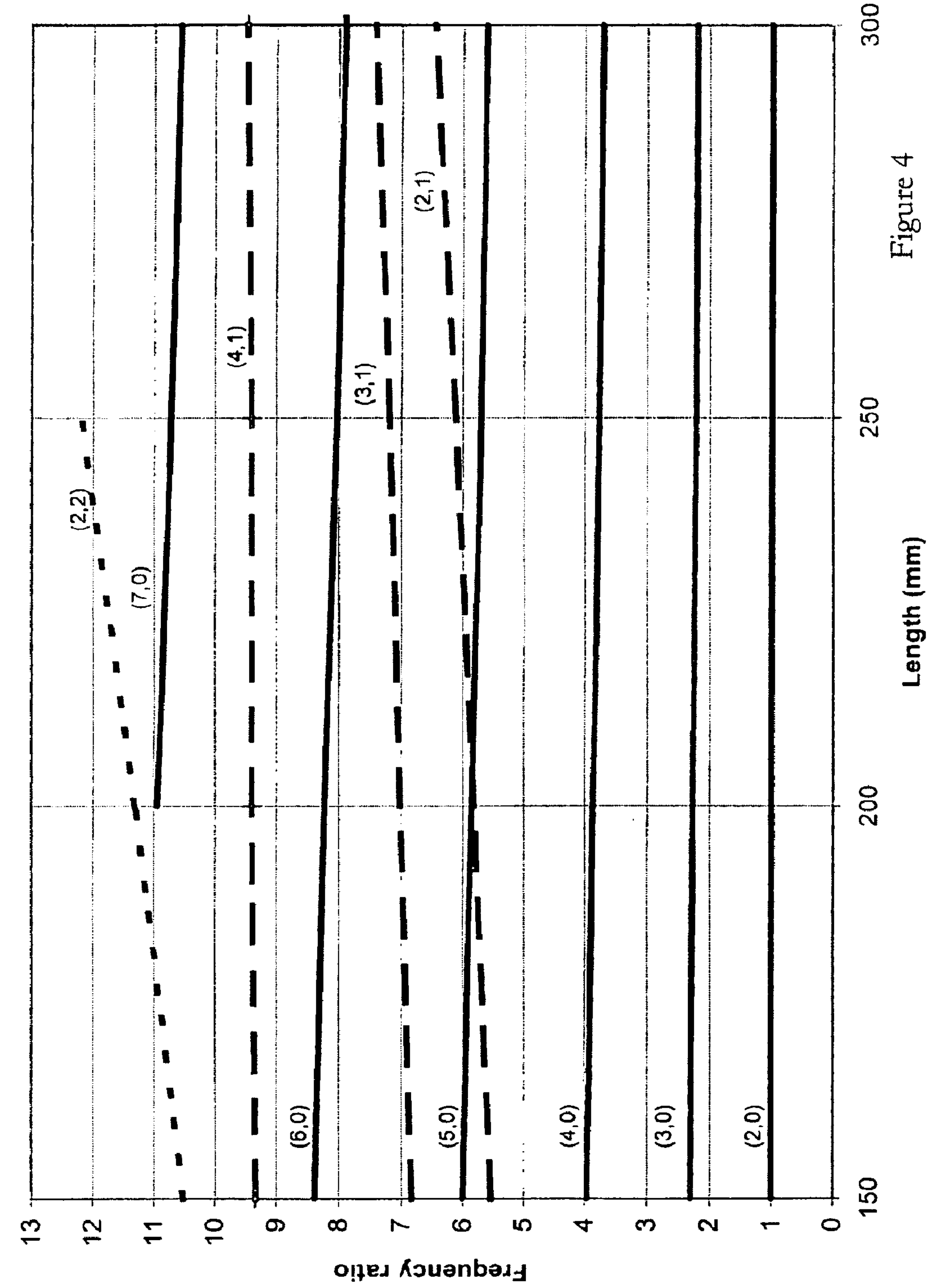
FIG. 4 is a graph which shows how the frequency ratios of the frequencies of the first several modes vary with the length of the side portion of an example bell.

Varying the length of the side portion of a bell is a shape feature according to the present invention. FIG. 4 shows how the frequency ratios of the frequencies of the first several modes vary with the length of the side portion, while other parameters remain unchanged, for an example bell shape with the following parameters. (These figures were determined using a finite element program.) The bell is essentially a truncated circular cone, with a cone angle of 35 degrees. The top portion is flat and has a thickness of 10 mm. The radius of the top portion is 36 mm, measured with respect to the top face of the top portion. The side portion is 10 mmm thick.

As can be seen from FIG. 4, it has been found that increasing the length of the side portion of a bell having a side portion in the form of a truncated cone, causes the frequency ratios of the first several (m,0) modes to drop slowly and the frequency ratios of the first several (m,1) modes to rise slowly. Thus, increasing the length of the side portion of a bell also tends to separate the (m,0) modes from the modes with ring nodes.

Figure 5:
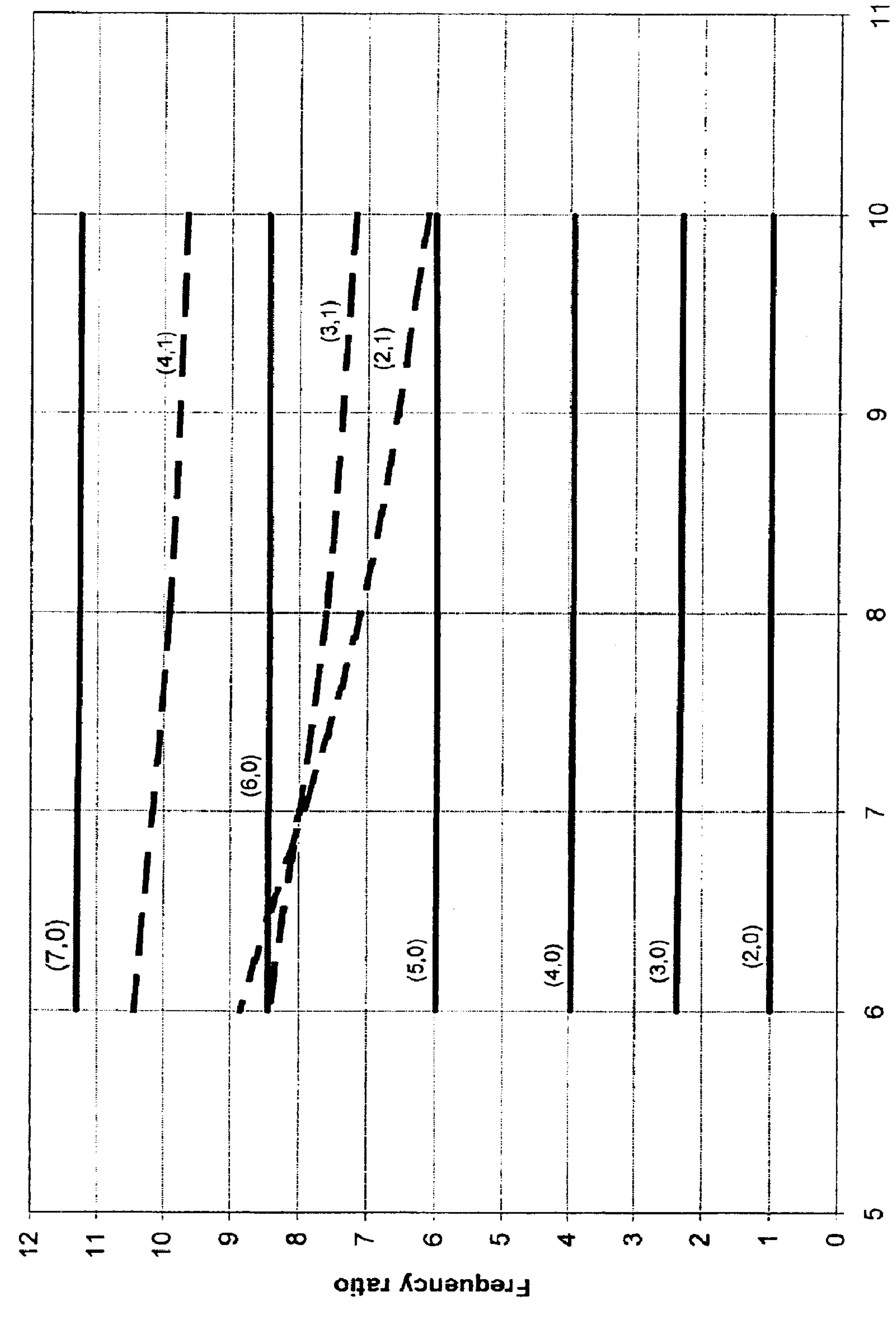
FIG. 5 is a graph which shows how the frequency ratios of the frequencies of the first several modes vary with wall thickness of an example bell.

Varying the wall thickness of the side portion of a bell is a shape feature according to the present invention. FIG. 5 shows how the frequency ratios of the frequencies of the first several modes vary with wall thickness, while other parameters remain unchanged, for an example bell shape with the following parameters. (These figures were determined using a finite element program.) The bell is essentially a truncated circular cone, with a cone angle of 35 degrees. The top portion is flat and has a thickness of 10 mm. The length of the side portion, measured in a direction parallel to the side portion, is 210 mm. The radius of the top portion is 36 mm, measured with respect to the top face of the top portion.

As can be seen from FIG. 5, it has been found that decreasing the wall thickness of the side portion of a bell having a side portion in the form of a truncated cone, causes the frequency ratios of the first several (m,0) modes to remain substantially unchanged and the frequency ratios of the first several (m,1) modes to rise moderately. Thus, decreasing the wall thickness of the side portion of a bell also tends to separate the (m,0) modes from the modes with ring nodes.

Typically, more than one shape feature according to the present invention will need to be utilised in order to achieve an initial bell shape where more than the first four modes are (m,0) modes. For example, it is usually necessary to include both conicity and wall taper.

According to a further aspect of the present invention, there is provided a method for designing a tuned bell wherein the frequencies of the first at least three modes are tuned, the method comprising the steps of selecting an initial bell shape and using the initial bell shape in an optimisation procedure according to the present invention, the initial bell shape being such that the frequencies of at least the first three modes each have no ring nodes, the initial bell shape being substantially in the form of a truncated circular cone.

Preferably, the optimisation procedure according to the present invention comprises the steps of:

(a) setting the current bell shape to an initial bell shape;

(b) selecting one of the frequencies to be tuned as a current objective;

(c) selecting a desired value for the current objective to attain or a desired range for the current objective to fall within;

(d) modifying the current bell shape in accordance with an optimisation method, the optimisation method being to cause the value of the current objective to move towards the desired value or range;

(e) repeating step (d) as many times as necessary for the value of the current objective to become substantially equal to the desired value or for the objective to fall within the desired range;

(f) if the frequencies to be tuned are not substantially in an harmonic sequence, selecting one of the frequencies to be tuned as the current objective;

(g) repeating steps (c) to (e) in relation to the current objective, subject to a suitably chosen constraint or constraints to cause at least one of the frequencies to be tuned to approach or attain a desired value or desired frequency ratio; and (h) repeating steps (f) and (g) until the frequencies to be tuned are substantially in an harmonic sequence.

Whether or not an initial shape is suitable can easily be determined by attempting an optimisation. If an optimisation is unsuccessful (ie it is not possible to obtain the desired objectives) then the initial shape is not suitable. For example, if, say, the sixth frequency cannot be sufficiently reduced during optimisation for its frequency ratio to be approximately 6.0, then it will be appropriate to first determine the mode type of the sixth frequency in order to decide what action to take. If the sixth frequency is an (m,0) mode (it would therefore be expected to be the (7,0) mode), the shape can be modified by applying one or more shape features that tend to reduce the frequency ratios of (m,0) modes, for example increasing the cone angle, increasing the wall taper or increasing the length. If the sixth frequency is not an (m,0) mode, it may be appropriate to introduce shape features for the purpose of reducing the frequency ratios of (m,0) modes relative to other mode types such that the sixth frequency becomes an (m,0) mode.

In carrying out the optimisation procedure according to the present invention it is generally necessary to observe and utilise the manner in which the choice of objective and constraints behave. In general, if no performance constraints are placed on frequencies other than the objective then the other frequencies may, and generally do, change as a consequence of optimising the particular objective. If any one frequency, other than the objective, is constrained, it is possible that this will cause an unconstrained frequency to be changed during optimisation in a different manner to that observed without the constraint.

It is generally necessary to observe and utilise this behaviour in carrying out the optimisation.

For example, using a starting shape substantially in the form of a truncated circular cone, it has been observed that, in a particular case, that if the objective is the frequency of the (2,0) mode which is to be increased, then if the (5,0) mode is constrained (generally it is constrained as an absolute value, based on a desired frequency ratio) then the frequencies of several modes with frequencies higher than the (5,0) mode (including modes with and without ring nodes) will decrease where they would have been likely to increase in the absence of the constraint.

More generally, for (m,0) modes, it has been observed that raising a lower frequency while constraining a single higher frequency tends to cause the frequencies above the constrained frequency to be decreased, and frequencies between the objective and the constraint to be increased. Similarly, for (m,0) modes, it has been observed that lowering a higher frequency while constraining a single lower frequency tends to cause the frequencies below the constrained frequency to be increased, and frequencies between the objective and the constraint to be decreased. Further, and also for (m,0) modes, the closer a frequency is to the constrained frequency (in terms of frequency sequence rather than magnitude of frequency), the less it will move.

These typical behaviours are not particularly surprising once one is acquainted with FIGS. 1 to 5, from which it may be seen that when a parameter is changed (such as cone angle or wall taper) such that the frequency ratios of the various (m,0) modes are changed, the frequency ratios of the various (m,0) modes tend to remain approximately evenly spaced.

The above observed typical behaviours of (m,0) modes when optimising an objective in conjunction with a single constraint can be usefully considered as a kind of "lever principle". That is, if each frequency when graphed with respect to the frequency sequence is imagined as being rigidly connected to one another, then the constraint may be considered as a kind of fulcrum and the objective frequency (ie the particular frequency being optimised) as a kind of levering point. Thus, according to this "principle", when the objective frequency is pushed up or down (by specifying an objective that is higher or lower than the current value) then the other (m,0) frequencies generally tend to move in the direction that they would move if actually joined by the imagined rigid connection, and the other (m,0) frequencies generally tend to move a distance approximately of the order that they would move if actually joined by the imagined rigid connection. Thus, the constraint (or fulcrum) does not move and points near the fulcrum generally move less than points further away from the fulcrum.

The "lever principle" referred to above may be more clearly understood with reference to the example given below. The "lever principle" is presented as a guide to making suitable choices when carrying out optimisations. The "principle" is not necessarily universally applicable but the present inventors have found it a useful guide in carying out the optimisations for the two harmonic bells of which details are presented in this specification. Examples of the application of this "principle" are given in example 1, below.

A simple way of finding an appropriate starting shape for conducting an optimisation according to the present invention is to take the shape of an harmonic bell already designed in accordance with the present invention, to rescale it, and to then use it as a starting point for a further optimisation to generate an harmonic bell design for a differently sized (and hence pitched) bell.

Harmonic bells of different pitch may be generated by rescaling harmonic bells already designed in accordance with the present invention. If the rescaling has not caused the tuned modes to lose their harmonic tuning, then no further optimisation is necessary and a differently pitched harmonic bell may then simply be constructed in accordance with the resealed design.

One can use the foregoing methods to generate a range of harmonic bells with different fundamental frequencies. Once two harmonic bells of similar shape are generated, one can plot fundamental frequency against some dimension, such as mouth radius, and join the two points with a straight line. This line can be used as a guide in selecting a scaling factor to generate a bell of given fundamental frequency from using a rescaled known bell shape as an initial bell shape for optimisation. This method may in some cases be an approximation only and in these cases it would be expected that some experimentation would be required to select an appropriate scaling factor to be able to generate a new harmonic bell of a particular fundamental frequency with an existing harmonic bell shape.

Preferably the method for determining the frequencies of the modes of the current bell shape in an optimisation procedure according to the present invention is the finite element method.

The optimisation method must determine the so-called "step direction" at each iteration. The step direction is the modification to be made to the bell shape during the given iteration. Preferably the optimisation method uses gradient methods to determine the step direction. Preferably, the method of conjugate gradient is used. The method of steepest descent may be used.

According to a preferred embodiment of the present invention, the method for determining the frequencies of the modes of the current bell shape is the finite element method and the optimisation method effects shape modifications during each iteration by way of moving the nodes of the finite element mesh defining the bell. (The nodes of the finite element mesh refer to the points where elements are connected to one another and are not to be confused with the nodes occurring in the various modes of vibration of a bell.)

The optimisation method used in this preferred embodiment will now be described. The computer software called ReSHAPE by Advea Engineering Pty Ltd (a company incorporated in Victoria, Australia) is used to effect the optimisation method. The invention is expressly not limited to the use of this package to effect the optimisation method according to the present invention. In the preferred embodiment, the sensitivities are calculated at each node of the finite element mesh. The sensitivity at a particular node is a measure of the rate of change of the objective (ie of the frequency of the chosen mode) with respect to a change of the node position. The meaning of the sensitivity is further discussed below in relation to Cartesian coordinates (x, y, z) with corresponding unit vectors i, j and k. It will be readily appreciated by those skilled in the art that other coordinate systems may be used.

The rate of change of the objective with respect to a change of nodal position in each coordinate direction is calculated. If the value of the objective is designated P, then the rate of change of the objective with respect to a change of position of the node in the x direction is $$\frac{\partial P}{\partial x}.$$

The rates of change of the objective with respect to a change of position of the node in the y and z directions are, respectively, $$\frac{\partial P}{\partial y}$$

and $$\frac{\partial P}{\partial z}.$$

The sensitivity at a particular node is defined as the vector $$\frac{\partial P}{\partial x}i+\frac{\partial P}{\partial y}j+\frac{\partial P}{\partial z}k$$

(ie the sensitivity is the gradient of the scalar field P). The sensitivity vector points in the direction in which movement of the node will cause the greatest change to the objective. The magnitude of the sensitivity represents the maximum possible rate of change of the objective that can result from a movement of the node in question, which rate of change may generally only actually occur if the node is moved in the direction of the sensitivity vector.

In ReSHAPE, the sensitivities at each point are calculated analytically.

It is convenient to describe the optimisation method used in the preferred embodiment with reference to a cylindrical coordinate system in which the axial direction coincides with the axis of symmetry of the bell, the radial direction is normal to the axial direction and the circumferential direction is normal to the radial direction.

In the preferred embodiment, the outer surface of the side portion of the bell is constrained and only the position of the inner surface of the side portion may be changed by the optimisation method. Further, the inner surface may only move in the radial direction with respect to the axis of symmetry of the bell, that is, towards or away from the axis. Further, in order to retain an axisymmetric shape, all circumferential points on the inner (or outer) surface at a given axial location must be moved by the same amount in the radial direction (known as an "averaging constraint").

In the preferred embodiment, the step direction is determined following determination of the sensitivities as follows. Firstly, the sensitivities for all circumferential locations at a given axial location are averaged in cylindrical coordinates to determine an average sensitivity vector for that axial location. Next, the magnitudes of all the averaged sensitivity vectors for each axial location are normalised with respect to the magnitude of the averaged sensitivity vector with the largest magnitude. A preliminary step direction is then determined as the shape of the normalised averaged sensitivity vectors.

This preliminary step direction is used to calculate the final step direction after taking into account the effect of the performance constraints. For example, if the shape of the bell has already been modified so that the first two modes are in the frequency ratio 1:2, then the optimisation for the frequency of the third mode should be subject to the constraints that the frequencies of the first two modes do not change. In the preferred embodiment, these constraints are effected by determining the sensitivities with the respect to the constrained modes in the same manner as for determining the sensitivities for the objective. Because a shape change normal to the sensitivity vector for the constrained mode will cause the frequency of that mode to change the least, the preliminary step direction may be projected onto the hypersurface normal to the sensitivity vector for the constrained mode to determine a refined step direction. Once this process has been repeated with respect to all performance constraints (in the example, the frequencies of the first two modes), the resulting refined step direction will be the step direction for that iteration.

The step size may be user specified or based on a suitable optimisation of the step size with respect to the objective, before the step is taken.

EXAMPLE 1

As an example of the application of the principles relating to optimisations according to the present invention, Table 1 sets out the results of an optimisation carried out on an initial bell shape generated as follows. The bell shape is generated from a truncated cone by introducing shape features (concavity, taper and extra length) to a truncated cone shape, as described below.

Firstly, a truncated cone was generated with a cone angle of 25°, 10 mm wall thickness and 36 mm top radius, the top portion being 10 mm thick. A concavity was introduced by first translating the midpoint of the outer surface of the side portion by 20 mm normal to the initial line. An initial curve defining the inner surface was generated by translating a curve of equivalent curvature to the curve defining the outer surface so that the side portion is 10 mm thick.

A taper was then introduced by rotating the initial inner surface curve around its midpoint such that the thickness of the side portion at the extremity adjacent the mouth was 5 mm thick, measured in a direction normal to the outer surface. A continuation of the arc of a circle defining the inner surface of the side portion was necessary so that the curve defining the inner surface would intersect the line normal to the outer surface at the end of the outer surface in order to define the thickness of 5 mm.

Finally, an additional cylindrical portion was added to the existing side portion, the additional portion having a uniform thickness of 5 mm and a length of 20 mm.

This initial shape was chosen having regard to the shape features discussed above. Potential initial shapes were analysed (by the finite element method) and modified by adding shape features as discussed above until a suitable initial shape was achieved.

to raise the first (fundamental) frequency. That is, the frequency of the fifth frequency was constrained at 1703 Hz and the first frequency was made the objective function with an objective of 340 Hz (being approximately one fifth of the frequency of the fifth frequency in the frequency sequence). The tolerance on the constraint was not changed.

These optimisation conditions would be expected to raise the frequency of the fundamental and to lower the frequencies of those frequencies above the fifth frequency in the frequency sequence. Further, the second, third and fourth frequencies would not be expected to have their presently favourable ratios significantly changed, due to the "lever principle".

Figure 9:
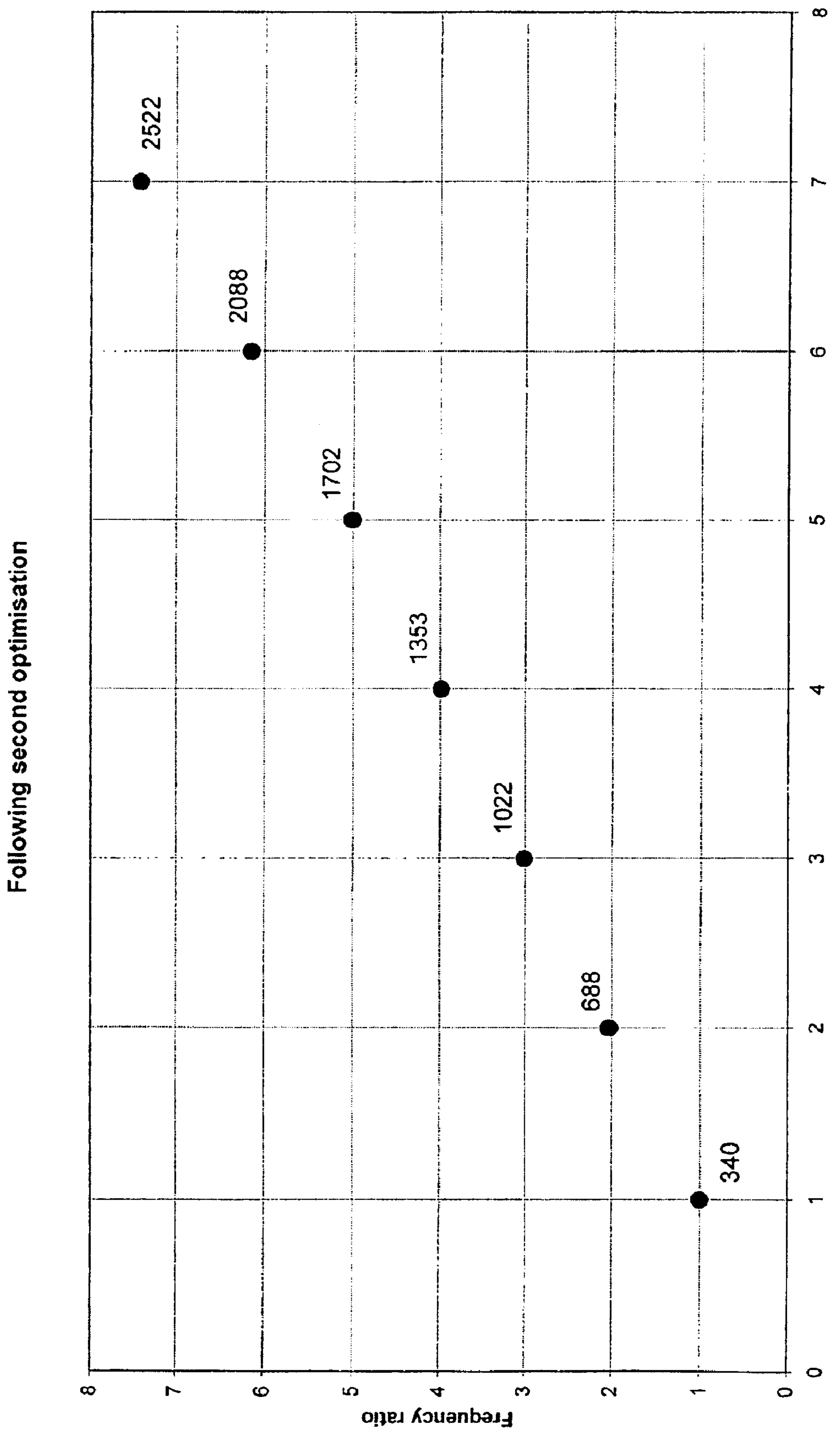
FIG. 9 is a graph showing the relationship of frequency to frequency ratio following a second optimisation.

The results of the second optimisation are shown graphically in FIG. 9. The first five frequencies are now substantially in an harmonic sequence. It can be seen that the frequency ratios of the sixth and seventh frequencies still

TABLE 1

| | Frequency | | | | | | | | | | | | | |
|---|---|---|---|---|---|---|---|---|---|---|---|---|---|---|
| | 1 freq | 1 ratio | 2 freq | 2 ratio | 3 freq | 3 ratio | 4 freq | 4 ratio | 5 freq | 5 ratio | 6 freq | 6 ratio | 7 freq | 7 ratio |
| Initial shape | 292 | 1 | 645 | 2.209 | 1083 | 3.709 | 1615 | 5.531 | 2238 | 7.664 | 2805 | 9.606 | 2920 | 10 |
| After 1st iteration | 322 | 1 | 642 | 1.994 | 959 | 2.978 | 1305 | 4.053 | 1703 | 5.289 | 2163 | 6.717 | 2686 | 8.342 |
| After 2nd iteration | 340 | 1 | 688 | 2.024 | 1022 | 3.006 | 1353 | 3.979 | 1702 | 5.006 | 2088 | 6.141 | 2522 | 7.418 |
| After 3rd iteration | 343 | 1 | 696 | 2.029 | 1034 | 3.015 | 1361 | 3.968 | 1692 | 4.933 | 2045 | 5.962 | 2434 | 7.096 |
| ERROR | | | | 0.015 | | 0.005 | | −0.01 | | −0.01 | | −0.01 | | 0.014 |

Figure 7:
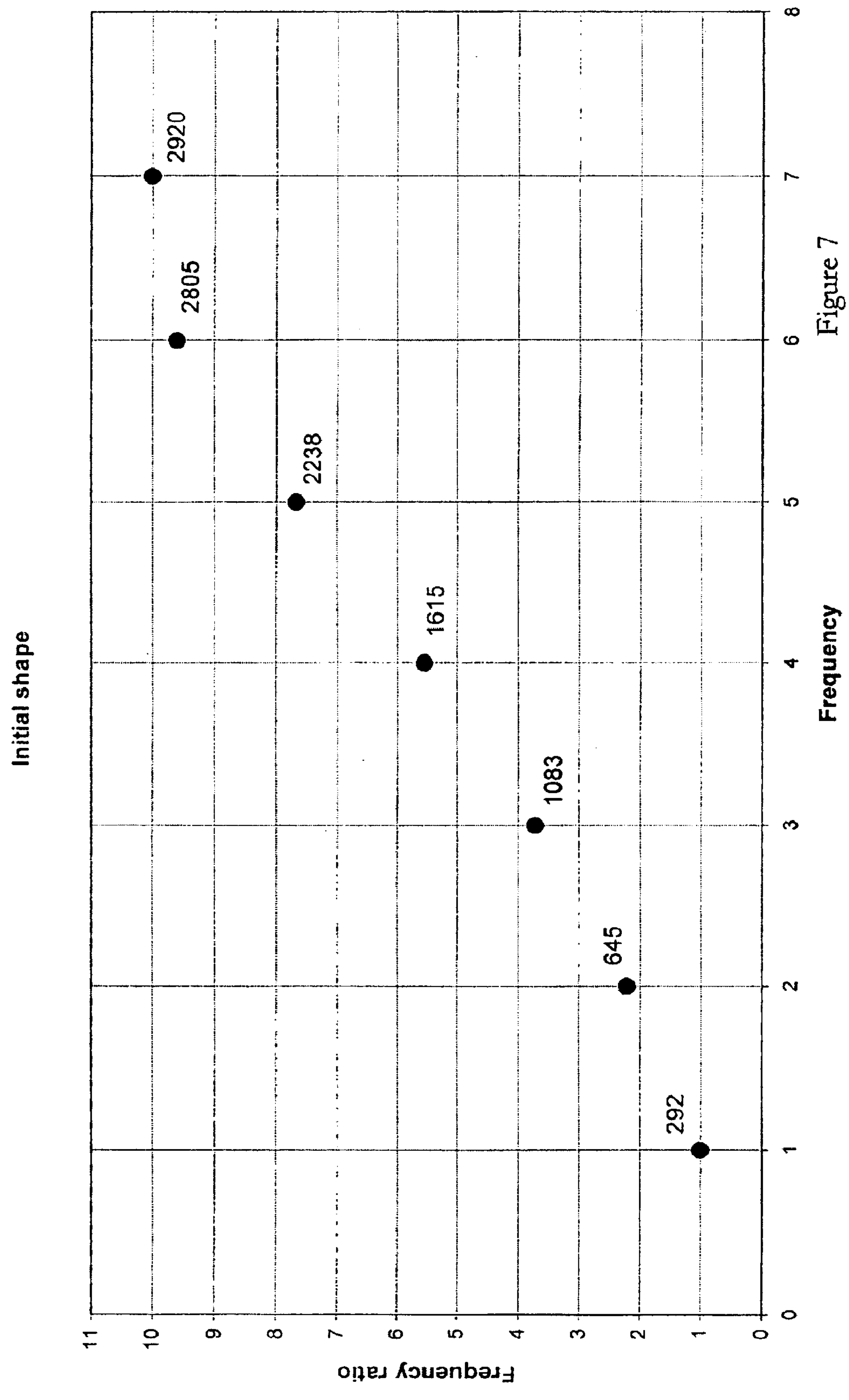
FIG. 7 is a graph showing the relationship of frequency to frequency ratio for an initial bell shape.

FIG. 7 graphically shows the frequency ratios of the first 7 frequencies in the frequency sequence for the initial bell shape. The absolute frequencies (as opposed to frequency ratios) in Hertz are listed adjacent their respective points on the graph. From FIG. 7 it can be seen that the frequency ratios of all the frequencies in the frequency sequence (other than the fundamental) need to be decreased. Using the "lever principle" discussed above as a guide, it was decided to constrain the second frequency (in an absolute sense) and to raise the first (fundamental) frequency. That is, the frequency of the second frequency was constrained at 645 Hz and the first frequency was made the objective function with an objective of 322 Hz (being approximately half of the frequency of the second frequency in the frequency sequence). The tolerance on the constraint was ±0.6%.

These optimisation conditions would be expected to raise the frequency of the fundamental with respect to the second frequency and to lower the frequencies of those frequencies above the second frequency in the frequency sequence. The higher frequencies would be expected to be lowered more than the lower frequencies. Raising the frequency of the fundamental frequency has a further effect on the frequency ratios because raising the frequency of the fundamental frequency would lower the other frequency ratios even if the other frequencies were to remain unchanged. Thus raising the frequency of the fundamental frequency causes the frequencies being reduced to have frequency ratios changed by a proportionately greater amount than the change to the absolute frequencies.

Figure 8:
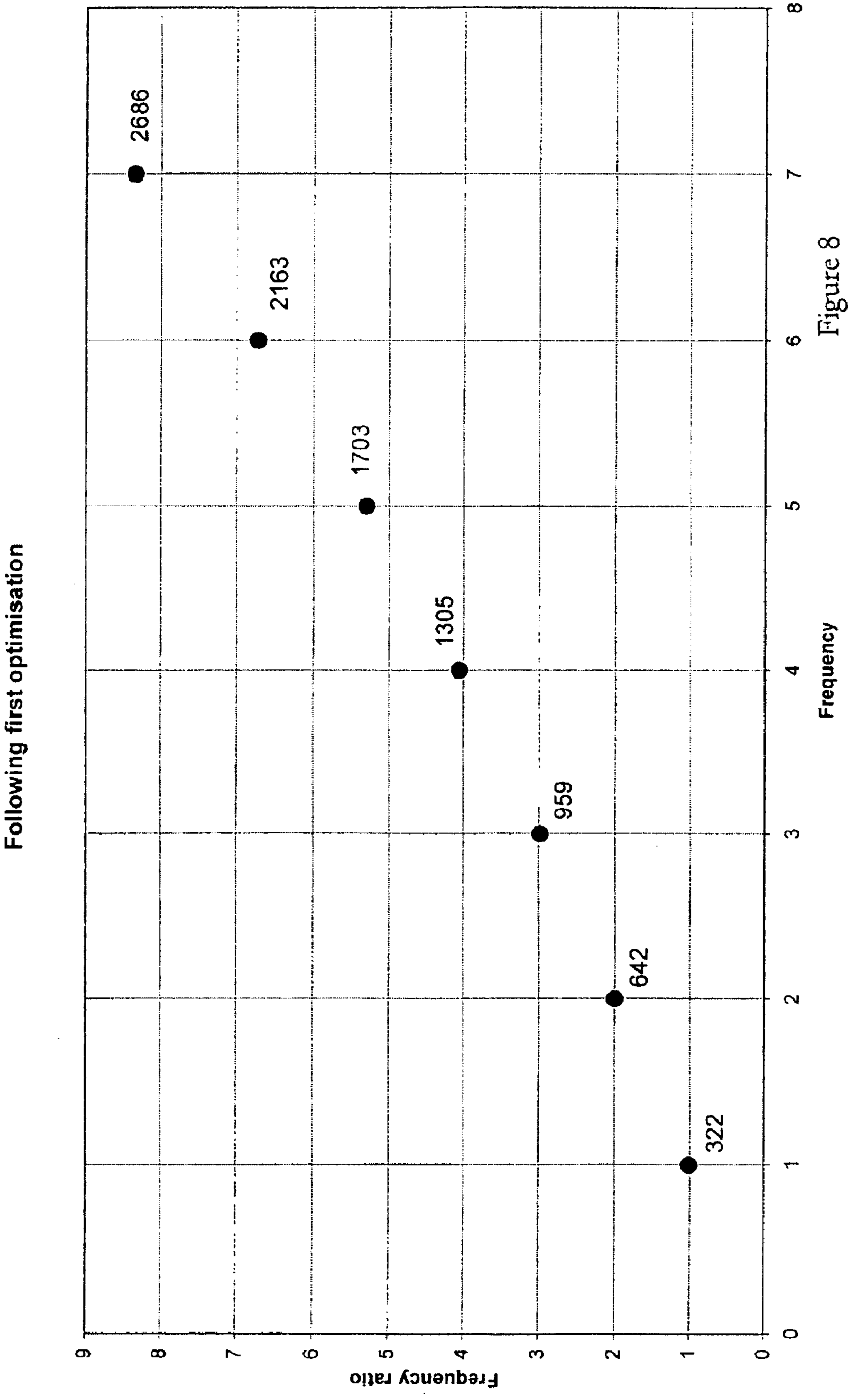
FIG. 8 is a graph showing the relationship of frequency to frequency ratio following a first optimisation.

The results of the first optimisation are shown graphically in FIG. 8. From FIG. 8 it can be seen that the frequency ratios of the fifth and higher frequencies in the frequency sequence need to be decreased. Using the "lever principle" as a guide, it was decided to constrain the fifth frequency and need to be reduced if they are to form part of the harmonic sequence. Using the "lever principle" as a guide, it was decided to constrain the fifth frequency and to lower the seventh frequency.

Using the "lever principle" it was realised that lowering the seventh frequency would be expected to raise the first frequency, so that it would not be desirable to try to reduce the seventh frequency to seven times the first frequency. In general terms, it is appropriate to try to lower the seventh frequency to seven times an amount that slightly exceeds the first frequency. That is, it was not considered appropriate to try to reduce the seventh frequency to 2380 Hz. Rather, it was considered appropriate to attempt to reduce the seventh frequency to an amount somewhat in excess of 2380 Hz, such as, say 2390 or 2400 Hz.

However, observation of the behaviour of trial third optimisations indicated that the seventh frequency could not be reduced to around this level without introducing errors into the other frequencies. Thus, as a compromise, it was decided to reduce the seventh frequency to 2434 Hz, this frequency appearing to be the best way of making the seventh frequency approach the desired level without upsetting the ratios of the other frequencies.

Thus, the magnitude of the fifth frequency was constrained at 1702 Hz and the seventh frequency was made the objective function with an objective of 2434 Hz. The tolerance on the constraint was not changed.

Figure 10:
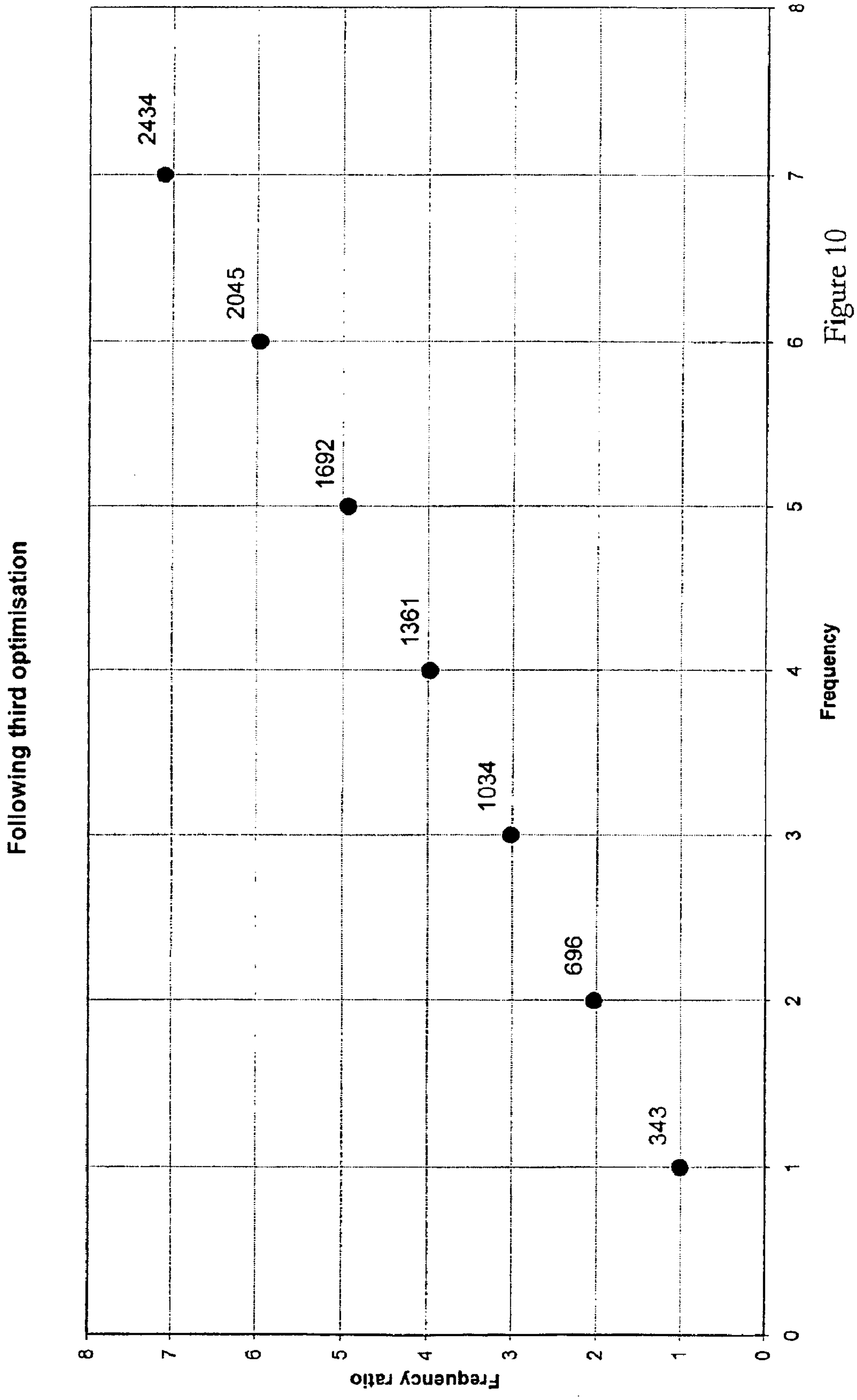
FIG. 10 is a graph showing the relationship of frequency to frequency ratio following a third optimisation.

The results of the third optimisation are shown graphically in FIG. 10. As can be seen, the first seven frequencies are substantially in an harmonic sequence. The errors as compared to an ideal harmonic sequence are provided in table 1.

The first seven frequencies are all due to (m,0) modes. That is, the first seven modes are (2,0), (3,0), (4,0), (5,0), (6,0), (7,0), and (8,0).

Figure 11:
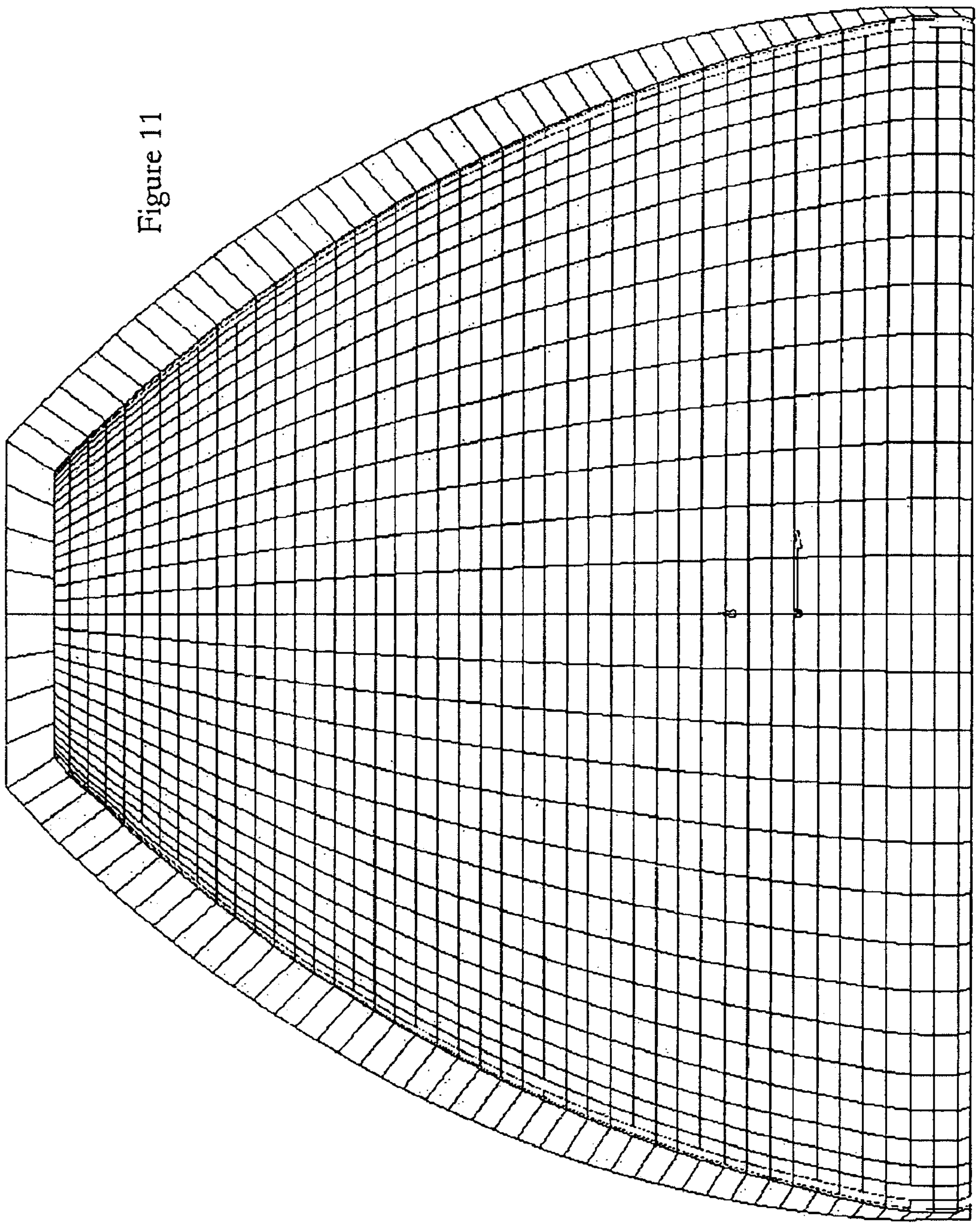
FIG. 11 is a representation of an harmonic bell designed in accordance with the present invention.

A representation of the harmonic bell designed in example 1 is given in FIG. 11. Table 2 provides a list of the coordinates (in cartesian/rectangular coordinates) of the nodes shown in FIG. 11 to define the shape of the inner surface of the bell. The origin of the coordinates is shown in FIG. 11 and is located on the axis of symmetry about a quarter of the height of the bell above the mouth of the bell.

Table 3 provides a list of the coordinates of the three points that together define the curved part of the outer surface of the side portion. The curved part of the outer surface is defined by fitting the arc of a circle to the three points. The additional cylindrical part of the outer surface of the side portion is formed by continuing the bottom of curve defined in Table 3 to the point (125.2,−38.4).

TABLE 2

| Node | x | y |
|---|---|---|
| 1 | 122.6 | −38.6 |
| 2 | 123.5 | −35.7 |
| 3 | 123.5 | −30.5 |
| 4 | 123.4 | −25.3 |
| 5 | 122.7 | −19.9 |
| 6 | 121.7 | −14.7 |
| 7 | 120.6 | −9.6 |
| 8 | 119.5 | −4.5 |
| 9 | 118.3 | 0.6 |
| 10 | 117.1 | 5.7 |
| 11 | 115.7 | 10.8 |
| 12 | 114.3 | 15.8 |
| 13 | 112.9 | 20.8 |
| 14 | 111.3 | 25.7 |
| 15 | 109.7 | 30.7 |
| 16 | 108 | 35.6 |
| 17 | 106.3 | 40.5 |
| 18 | 104.5 | 45.4 |
| 19 | 102.6 | 50.2 |
| 20 | 100.6 | 55 |
| 21 | 98.6 | 59.8 |
| 22 | 96.5 | 64.5 |
| 23 | 94.3 | 69.2 |
| 24 | 92.1 | 73.9 |
| 25 | 89.8 | 78.6 |
| 26 | 87.4 | 83.2 |
| 27 | 85 | 87.8 |
| 28 | 82.4 | 92.3 |
| 29 | 79.9 | 96.8 |
| 30 | 77.2 | 101.2 |
| 31 | 74.5 | 105.6 |
| 32 | 71.7 | 110 |
| 33 | 68.8 | 114.3 |
| 34 | 65.9 | 118.6 |
| 35 | 62.9 | 122.8 |
| 36 | 59.8 | 127 |
| 37 | 56.7 | 131.2 |
| 38 | 53.6 | 135.3 |
| 39 | 50.3 | 139.3 |
| 40 | 47 | 143.3 |
| 41 | 43.7 | 147.3 |
| 42 | 40.3 | 151.2 |
| 43 | 36.8 | 155.1 |
| 44 | 33.3 | 158.9 |
| 45 | 29.8 | 162.3 |

TABLE 3

| Node | x | y |
|---|---|---|
| 1 | 125.2 | −17.7 |
| 2 | 98.3 | 85.9 |
| 3 | 36 | 172.8 |

EXAMPLE 2

Figure 12:
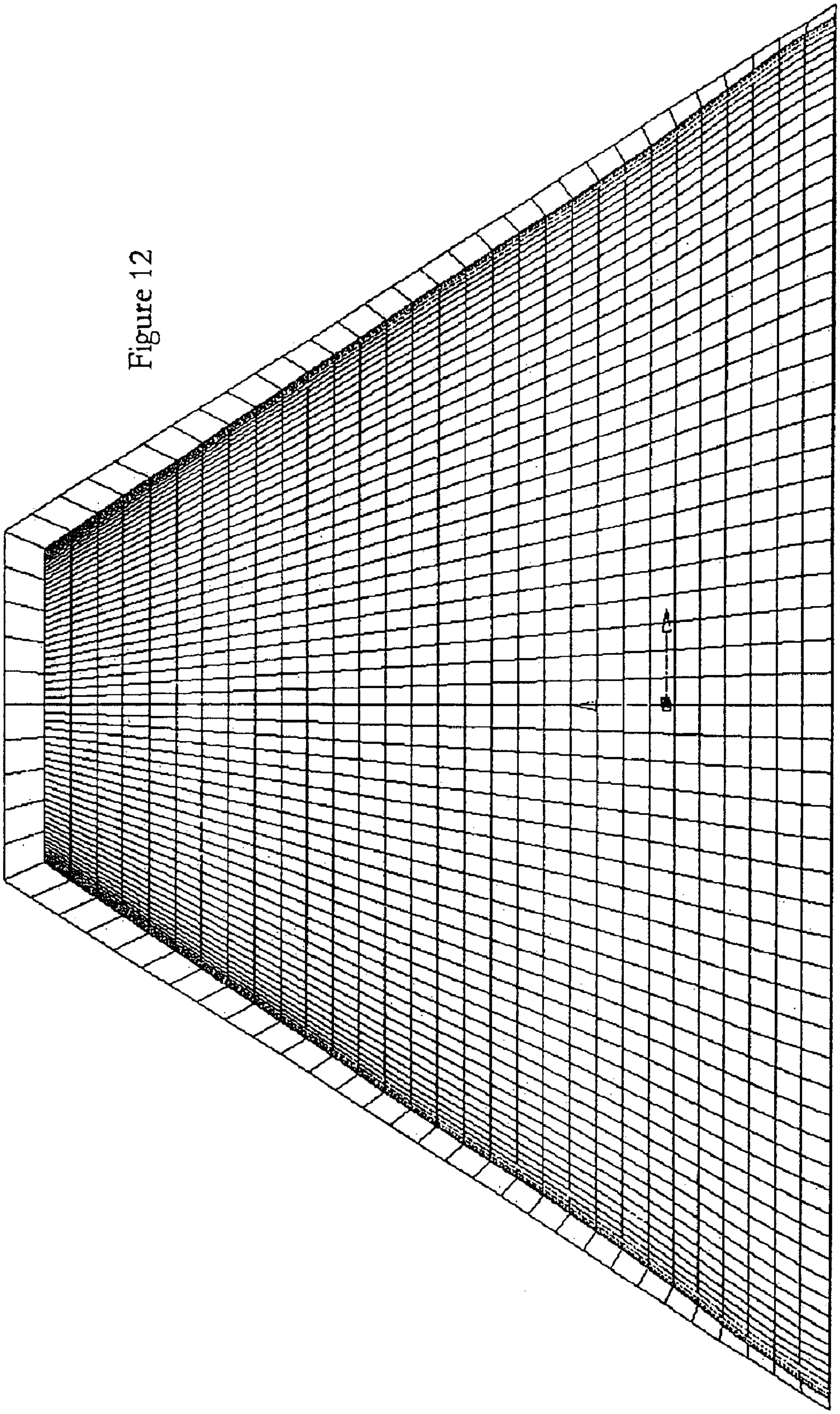
FIG. 12 is a further representation of an harmonic bell designed in accordance with the present invention.

FIG. 12 provides a further example of an harmonic bell designed in accordance with the present invention. Table 4 shows the frequencies and frequency ratios of the first seven frequencies in the frequency sequence. The first seven frequencies are all due to (m,0) modes. That is, the first seven modes are (2,0), (3,0), (4,0), (5,0), (6,0), (7,0), and (8,0).

Table 5 provides a list of the coordinates of the nodes that together define the inner surface of the side portion. Table 6 provides the two points which, when joined by a straight line, defines the shape of the side portion.

TABLE 4

| | Frequency | | | | | | | | | | | | | |
|---|---|---|---|---|---|---|---|---|---|---|---|---|---|---|
| | 1 freq | 1 ratio | 2 freq | 2 ratio | 3 freq | 3 ratio | 4 freq | 4 ratio | 5 freq | 5 ratio | 6 freq | 6 ratio | 7 freq | 7 ratio |
| Final shape | 186 | 1 | 375 | 2.016 | 556 | 2.989 | 739 | 3.973 | 919 | 4.941 | 1121 | 6.027 | 1300 | 6.989 |
| Error | | | | 0.008 | | 0.000 | | −0.01 | | −0.01 | | 0.004 | | 0.000 |

TABLE 5

| Node | x | y |
|---|---|---|
| 1 | 196.6 | −49.9 |
| 2 | 191.5 | −40.9 |
| 3 | 186.3 | −33 |
| 4 | 181 | −25.3 |
| 5 | 175.7 | −17.7 |
| 6 | 170.3 | −10.1 |
| 7 | 165 | −2.5 |
| 8 | 159.8 | 5.2 |
| 9 | 154.7 | 13.1 |
| 10 | 149.7 | 21 |
| 11 | 144.8 | 29 |
| 12 | 139.9 | 36 |
| 13 | 135.1 | 45 |
| 14 | 130.2 | 536 |
| 15 | 125.3 | 61.1 |

TABLE 5-continued

| Node | x | y |
|---|---|---|
| 16 | 120.4 | 69.1 |
| 17 | 115.5 | 77.1 |
| 18 | 110.5 | 85.1 |
| 19 | 105.6 | 93 |
| 20 | 100.6 | 100.9 |
| 21 | 95.5 | 108.8 |
| 22 | 90.5 | 116.7 |
| 23 | 85.4 | 124.6 |
| 24 | 80.4 | 132.4 |
| 25 | 75.3 | 140.3 |
| 26 | 70.3 | 148.2 |
| 27 | 65.2 | 156 |
| 28 | 60.2 | 163.9 |
| 29 | 55.1 | 171.8 |
| 30 | 50.1 | 179.6 |
| 31 | 45 | 187.5 |

TABLE 6

| Node | x | y |
|---|---|---|
| 1 | 200 | −50 |
| 2 | 50 | 200 |

In these two examples, the outer surface was constrained and thus remains identical to the outter surface of the initial shape used in the optimisation procedure. (As stated above, the inner surface could have been constrained instead, in which case the inner surface would remain identical to the inner surface of the initial shape.)

The changes introduced by the optimisation procedure, though of critical importance to the frequency sequence of the bell, are only barely visible when the bell design is viewed as a whole. Thus, in the case of FIG. 11, although the inner surface in fact has an irregular shape, it is generally concave, as the inner surface of the initial bell shape was concave. Similarly, in FIG. 12, although the inner surface in fact has an irregular shape, it is generally in the form of a truncated circular cone, as the inner surface of the initial bell shape was precisely in the form of a truncated circular cone.

The word 'comprising' and forms of the word 'comprising' as used in this description does not limit the invention claimed to exclude any variants or additions.

Modifications and improvements to the invention will be readily apparent to those skilled in the art. Such modifications and improvements are intended to be within the scope of this invention.

The claims defining the invention are as follows:

1. A method for designing a bell shape for a bell having a plurality of modal frequencies, wherein the first three of said frequencies, at minimum, are substantially in an harmonic sequence, the method comprising the steps of selecting an initial bell shape and using the initial bell shape in an optimization procedure for modifying the bell shape such that said first three frequencies are substantially in an harmonic sequences, wherein said step of selecting the initial bell shape comprises choosing a starting geometry in which the lower frequency modes to be tuned by said optimization procedure are purely circumferential modes.

2. A method according to claim 1 wherein the initial bell shape is such that, of said modal frequencies due to circumferential modes without ring nodes are below any frequencies due to circumferential modes with ring nodes.

3. A method according to claim 2 wherein the initial bell shape has a top portion, a side portion and a mouth, the side portion extending from the top portion to the mouth, the initial bell shape being selected by introducing one or more of the following shape features to a first bell shape:

(a) conicity or increased conicity;

(b) tapering of the side portion or increased tapering;

(c) concavity with respect to the inside surface of the bell or increased concavity;

(d) increased length of the side portion; or (e) decreased thickness of the side portion.

4. A method according to claim 1 wherein the initial bell shape is such that the first at least three frequencies are due to circumferential modes with no ring nodes.

5. A method according to claim 1 wherein the initial bell shape is a resealed existing bell shape for a bell having the first at least three frequencies substantially in an harmonic sequence.

6. A method according to claim 1 wherein the optimization procedure comprises the steps of:

(a) setting the current bell shape to the selected initial bell shape;

(b) selecting one of the first three frequencies to be tuned as a current objective;

(c) selecting a desired value for the current objective to attain or a desired range for the current objective to fall within;

(d) modifying the current bell shape in accordance with an optimization method, the optimization method being to cause the value or the current objective to move towards the desired value or range;

(e) repeating step (d) as many times as necessary for the value of the current objective to become substantially equal to the desired value or for the objective to fall within the desired range;

(f) if the at least first three frequencies to the tuned are not substantially in an harmonic sequence, selecting one of the at least three frequencies to be tuned as the current objective;

(g) repeating steps (c) to (e) in relation to the current objective, subject to a suitably chosen constraint or constraints to cause at least one of the frequencies to be tuned to approach or attain a desired value or desired frequency ratio; and (h) repeating steps (f) and (g) until the at least first three frequencies are substantially in an harmonic sequence.

7. A bell having a bell shape designed in accordance with the method of any one of claims 1 to 4.

8. An axisymmetric bell having a top portion, a side portion and a mouth, the side portion extending from the top portion to the mouth, a meridonal cross-section of the side portion being substantially geometrically similar to a cross-section having:

(a) an outer line formed by fitting an arc of a circle to the three points having rectangular coordinates x, y of nodes as set out in table 3; and (b) an inner line formed by fitting a line to points having rectangular coordinates x, y of the nodes as set out in table 2.

9. An axisymmetric bell having a top portion, a side portion and a mouth, the side portion extending from the top portion to the mouth, a meridonal cross-section of the side portion being substantially geometrically similar to a cross-section having:

(a) an outer line formed by joining a straight line to two points having rectangular coordinates x, y of the nodes as set out in table 6; and (b) an inner line formed by fitting a line to points having rectangular coordinates x, y of the nodes as set out in table 5.

10. A harmonic bell having a plurality of modal frequencies comprised of means for producing the first at least two frequencies of the plurality substantially in an harmonic sequence and means for producing the third frequency of the plurality substantially in said an harmonic sequence, the means for producing the third frequency comprising choosing a starting geometry in which lower frequency modes are purely circumferential modes.

11. A bell having a plurality of modal frequencies, the bell having a bell structure wherein the lower frequency modes are purely circumferential modes, said structure including a top portion, a side portion and a mouth, the side portion extending from the top portion to the mouth, and physical characteristics of the bell structure being selected from the group consisting of conicity of the top portion, wall thickness of the top portion, length of the side portion, conicity of the side portion, wall taper of the side portion, wall curvature of the side portion, and wall thickness of the side portion, in a manner to provide optimal tuning means for producing a first three frequencies of the plurality of modal frequencies substantially in an harmonic sequence.

12. A bell as claimed in claim 11, wherein said circumferential modes have no ring nodes.

13. A bell as claimed in claim 11, wherein, of the modal frequencies, the frequencies due to said circumferential modes having no ring nodes are all below any frequencies due to circumferential modes having ring nodes.

14. A bell according to claim 11 wherein the outer surface of the side portion is generally in the form of a truncated circular cone.

15. A bell according to claim 11 wherein the inner surface of the side portion is generally in the form of a truncated circular cone.

16. A bell according to claim 11 wherein the outer surface of the side portion is generally convex.

17. A bell according to claim 11 wherein the inner surface of the side portion is generally concave.

18. A bell according to claim 11 wherein the outer surface of the side portion substantially consists of a generally convex portion and a portion generally in the form or a circular cylinder.

19. A bell according to claim 11 wherein the inner surface of the side portion substantially consists of a generally concave portion and a portion generally in the form of a circular cylinder.

20. A bell according to claim 11 wherein the outer surface of the side portion substantially consists of a generally convex portion and a portion generally in the form of a truncated circular cone.

21. A bell according to claim 11 wherein the inner surface of the side portion substantially consists of a generally concave portion and a portion generally in the form of a truncated circular cone.

22. A bell according to claim 11 wherein the side portion is generally tapered.

23. A bell as claimed in claim 11, wherein the first four of said frequencies, at minimum, are substantially in an harmonic sequence.

* * * * *

UNITED STATES PATENT AND TRADEMARK OFFICE

CERTIFICATE OF CORRECTION

PATENT NO. : 6,915,756 B1

DATED : July 12, 2005

INVENTOR(S) : McLachlan et al.

It is certified that error appears in the above-identified patent and that said Letters Patent is hereby corrected as shown below:

<u>Column 19,</u>
Line 58, delete “sequences” and insert therefor -- sequence --.

<u>Column 20,</u>
Line 14, delete “resealed” and insert therefor -- rescaled --.
Line 48, delete “1 to 4” and insert therefor -- 1, 2 or 4 --.

<u>Column 21,</u>
Line 8, delete “an”.
Line 14, after “said” insert -- bell --.

<u>Column 22,</u>
Line 11, delete “or” and insert therefor -- of --.

Signed and Sealed this

Thirteenth Day of September, 2005

JON W. DUDAS

*Director of the United States Patent and Trademark Office*